United States Patent [19]

Mauck

[11] 4,337,442

[45] Jun. 29, 1982

[54] FIRST LASER PULSE AMPLITUDE MODULATION

[75] Inventor: Michael S. Mauck, Portland, Oreg.

[73] Assignee: Electro Scientific Industries, Inc., Portland, Oreg.

[21] Appl. No.: 134,980

[22] Filed: Mar. 28, 1980

[51] Int. Cl.³ .............................................. H01S 3/13
[52] U.S. Cl. ...................................... 372/13; 372/69; 372/29
[58] Field of Search ................... 331/94.5 C, 945.5 Q, 331/94.5 S, 94.5 P

[56] References Cited

U.S. PATENT DOCUMENTS

| | | | |
|---|---|---|---|
| 3,297,876 | 1/1967 | De Maria | 331/94.5 Q |
| 3,564,454 | 2/1971 | Hook et al. | 331/94.5 Q |
| 3,747,019 | 7/1973 | Koechner et al. | 331/94.5 Q |

*Primary Examiner*—William L. Sikes
*Attorney, Agent, or Firm*—Oliver D. Olson

[57] ABSTRACT

The initially high amplitude laser output pulses at the start of a string of pulses from a continuously pumped, repetitively, Q-switched Nd:YAG laser are reduced in amplitude by reducing the current to the krypton arc lamp pumping light source by about 5 amperes for a time of about one-half to about one millisecond prior to gating the Q-switch.

7 Claims, 2 Drawing Figures

FIRST LASER PULSE AMPLITUDE MODULATION

BACKGROUND OF THE INVENTION

This invention relates to lasers, and more particularly to continuously pumped, repetitively Q-switched lasers employed in resistor trimming and other micromachining operations.

The initial few laser pulses of a string of pulses from a continuously pumped, repetitively Q-switched laser can be much larger than subsequent pulses in the string. This occurs when the laser has not been Q-switching for a time longer than the natural decay time associated with the atomic laser transition and when the Q-switch rate period is of the order of but less than the natural decay rate.

For example, for a Nd:YAG laser, large initial Q-switched pulses occur when the laser output has been quiescent more than about five milliseconds and the repetition rate is above approximately 1 Khz.

Since the Nd:YAG laser is used in thin film resistor trimming and other micromachining on delicate or damage-sensitive substrates, the sequence of laser operation is in the region where it produces damaging large initial pulses. These pulses must be prevented from reaching the sensitive substrate materials.

Traditionally, these initial large pulses are blocked and absorbed by a mechanical shutter which is activated with the laser gating signal and its mechanical time constant provides the required first pulse blocking. However, since the fastest mechanical shutter blocks the beam for a period of several milliseconds, the times involved in the opening and closing movements of the shutter are lost in the trimming or other machining process. For many short machining operations, the fraction of time lost in this manner can represent a significant loss of production.

Further, since the laser is blocked for several pulses by a moving mechanical device, there is presented a problem of synchronizing the beginning of transmitted pulses with the motion mechanism of the trimming or other machining apparatus, since these functions will not begin at the same place for different accelerations or velocity profiles or laser repetition rates.

Additionally, for certain trimming operations where only one or a few laser pulses are required, no reliable method of producing only a finite integer number of pulses is possible with a mechanical shutter.

Still further, the mechanically movable shutter is subject to wear, its operating life being inversely proportional to its operating rate. For high trimming rates of operation, shutter lifetime is excessively short.

SUMMARY OF THE INVENTION

In its basic concept, this invention provides for the production of uniform amplitude output pulses of a Q-switched laser by reducing the pumping level prior to gating the Q-switch, for a time and by an amount sufficient to reduce the energy stored in the lasing medium to a level no greater than the level it normally would recover to during the time between laser pulses at the operating repetition rate and pumping source level.

It is by virtue of the foregoing basic concept that the principal objective of this invention is achieved; namely, to overcome the aforementioned disadvantages and limitations of the mechanical shutter system of the prior art.

Another object of this invention is to provide a method and system by which to reduce the amplitude of the initially high amplitude output pulses at the start of a string of output pulses of a Q-switched laser substantially to the amplitude level of the remaining pulses in the string.

Still another object of this invention is to provide an electronic system for reducing the amplitude of output pulses of a Q-switched laser, minimizing the response time and reducing the amplitude of the damaging larger amplitude pulses at the beginning of a string of output pulses.

A further object of this invention is to provide an electronic system for controlling the amplitude of output pulses of a Q-switched laser, which system involves no moving parts to wear out.

A still further object of this invention is to provide an electronic system for controlling the amplitude of output pulses of a Q-switched laser which involves no moving parts to introduce delays in production operations.

Another object of this invention is to provide an electronic system for controlling the amplitude of output pulses of a Q-switched laser in which a fixed time delay is provided at the beginning of each laser pulse string, whereby compensation can be made to locate and synchronize the first emerging pulse with the motion mechanism of resistor trimming and other micromachining apparatus.

A further object of this invention is the provision of an electronic system for controlling the amplitude of output pulses of a Q-switched laser, which system is of simplified construction for economic manufacture.

The foregoing and other objects and advantages of this invention will appear from the following detailed description, taken in connection with the accompanying drawing of a preferred embodiment.

DESCRIPTION OF THE PREFERRED EMBODIMENT

Figure 1:
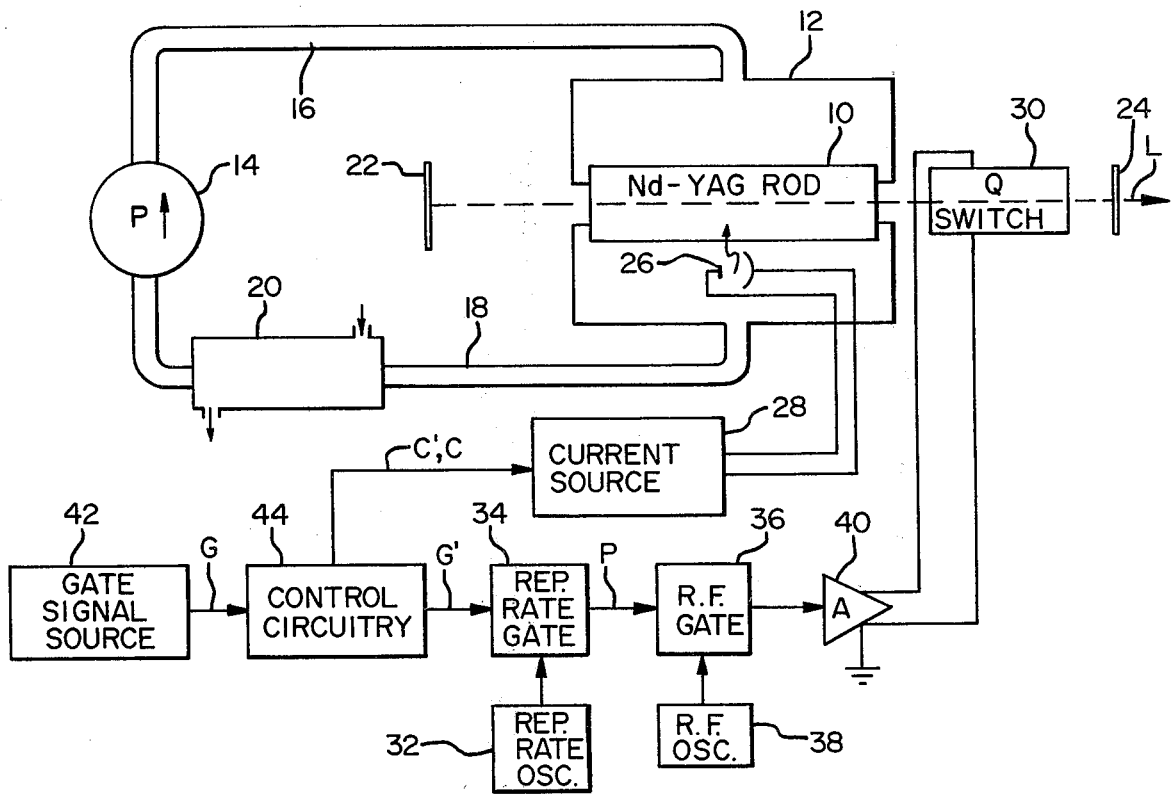
FIG. 1 is a schematic electrical diagram illustrating the method and system of laser output pulse amplitude control embodying the features of this invention.

For purposes of illustration, FIG. 1 shows schematically the structural arrangement of a conventional acousto-optic Q-switched laser. Thus, an elongated Nd:YAG rod 10 is mounted in a heat exchanger 12 through which a cooling liquid is circulated by means of a pump 14 and the interconnecting pipes 16 and 18. A second heat exchanger 20 encircles a portion of the upstream pipe 18 for cooling the liquid prior to its return to the heat exchanger 12. The second heat exchanger 20 typically provides cooling by means of tap water.

The ends of the laser rod 10 are exposed so that its longitudinal axis extends unobstructed between mirrors 22 and 24 spaced outwardly from the opposite ends of the rod.

The laser also includes a continuously pumped light source. For the Nd:YAG rod illustrated, the light source is a krypton arc lamp 26 connected to a source 28 of direct current.

An acousto-optic Q-switch 30 is shown interposed between the mirror 24 and the confronting end of the rod 10. The Q-switch is gated at a predetermined repetition rate by means of gating pulses P produced by a repetition rate oscillator 32 and applied through a repetition rate gate 34 to an RF gate 36. An RF signal is applied to the gate 36 from an RF oscillator 38. The gating pulses P interrupt the RF signal to amplifier 40 and hence to Q-switch 30. During this time of interruption the laser output pulse L builds up and is emitted from the laser.

Figure 2:
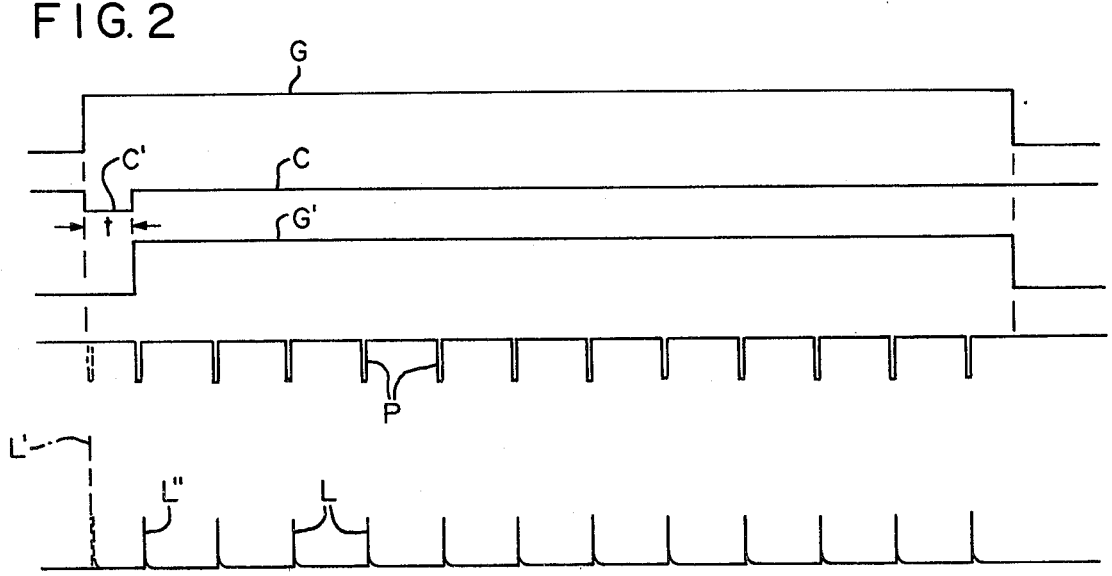
FIG. 2 is a graphic representation of a plurality of electrical waveforms of electric signals and laser output illustrating the operation of the system of FIG. 1.

In the operation of the foregoing conventional Q-switched laser, one or more large laser output pulses L' (FIG. 2) are produced upon application to the repetition rate gate 34 of the gate signal G provided by a gate signal source 42. It is these damaging large initial pulses that are reduced in amplitude by the method and system of this invention.

In accordance with this invention, a control circuit 44, in the form of conventional digital logic or analog circuitry, is interposed between the gate signal source 42 and the repetition rate gate 34. The output of the gate signal source thus is connected to the input of the control circuit 44, and an output of the control circuit is connected to the input of the repetition rate gate. This portion of the control circuit functions to provide a predetermined time delay for the gate signal G' applied to the Q-switch electronics described hereinbefore.

A second output of the control circuit 44 is connected to the direct current source 28, and it functions to reduce the current C to the arc lamp 26 by a predetermined amount C' and for a predetermined time t. For the laser illustrated, the direct current source is capable of supplying about 15 to 20 amperes of current to the krypton arc lamp, for normal operation. The reduction in current provided by the control circuit 44 is about 5 amperes, and the time t during which this reduced current is supplied is the same as the time delay provided for the gate signal G'.

For the laser illustrated in the drawing, the repetition rate of the gating pulses P, and hence the period of the laser output pulses L, is less than about one millisecond. Accordingly, a time delay t of at least one-half millisecond is required for the gate signal G' to the gate 34 and for the reduced current to the arc lamp. On the other hand, a time delay of more than about one millisecond for the highest repetition rate is unnecessary and contributes adversely to lost production time.

It is by virtue of the provision of the delayed gate G' to the Q-switch electronics and the reduced current C' to the arc lamp, both as provided by the control circuit 44, that one or more initial high amplitude laser pulses L'' at the start of the string of pulses, are leveled, i.e. reduced substantially to or slightly below the amplitude of the subsequent pulses L in the string of pulses.

This is achieved by virtue of the fact that during the time t of reduced lamp current, excited upper state population is reduced through spontaneous non-lasing emission. Gating the laser, i.e. opening the Q-switch during this time t, results in discharging the energy stored in the laser rod by further reduction of population. By the selection of proper conditions of reduced lamp current C' and time delay t, the anomalously large (for the reduced lamp current) first one or few laser pulses L'' thus produced are substantially equal to or slightly less than the amplitude of the subsequent laser pulses L produced continuously at the current level C to which the lamp is returned following discharge of the stored energy by the pulse L''.

In general, the basic requirement for effective performance in accordance with this invention is that the pumping light level provided by the arc lamp 26, or the level of any other pumping source, be reduced for a time and by an amount sufficient to reduce the energy stored in the rod 10 or other lasing medium to a level no greater than the level it normally would recover to during the time between laser pulses at the operating repetition rate and pumping source level. In practice, the reduction in lamp current, and hence light level, for the illustrated embodiment, of between about 25% and 35% from normal for about one-half millisecond prior to gating the Q-switch, has been found to be a favorable combination of time and current.

It will be apparent to those skilled in the art that various modifications and changes may be made in the details described hereinbefore. For example, the Nd:YAG laser rod may be replaced by ruby or other types of solid state laser rods or by other forms of lasers of the type that are capable of storing energy. An example of this latter type is a $CO_2$ gas laser that is electrically pumped. The krypton arc lamp also may be replaced by other continuously pumped light sources such as xenon and others, or by other forms of pumping media. The acousto-optic Q-switch may be replaced by an electro-optic Q-switch with corresponding modification of the electronic circuitry.

The source of current for the pumping medium may be of various types, such as RF, direct current and others, capable of being varied with sufficient speed relative to the laser pulse rate to effect a change in the input characteristics between the pulses to be controlled. The direct current source for the embodiment illustrated preferably is of the high frequency response type, capable of a slew rate of about five amperes per one hundred microseconds. Other combinations of magnitude and time of current reduction may be selected for specific conditions of laser output pulse leveling. These and other changes may be made as desired, without departing from the spirit of this invention and the scope of the appended claims.

Having now described my invention and the manner in which it may be used, I claim:

1. In a Q-switched laser having a lasing medium, a continuously pumping source, a Q-switch and a source of electric gating signal for said Q-switch, the combination therewith of electrical control circuit means connected to the pumping source for reducing the pumping level for a time and by an amount sufficient to reduce the energy stored in the lasing medium to a level no greater than the level it normally would recover to during the time between laser pulses at the operating repetition rate and pumping source level, the control circuit means being also connected to the gating signal source for delaying the gating signal for a time substantially equal to the time during which the pumping level is reduced.

2. The combination of claim 1 wherein the lasing medium is a solid state laser rod, the pumping source is a continuously pumped electric light source, and the electrical control circuit means is connected to the light source for reducing the pumping light level for a time and amount sufficient to reduce the energy stored in the laser rod to a level no greater than the level it normally would recover to during the time between laser pulses at the operating repetition rate and pumping light level, the control circuit means being also connected to the gating signal source for delaying the gating signal for a time substantially equal to the time during which the pumping light level is reduced.

3. The combination of claim 1 wherein the pumping source is an electric light having a current source, the source of electric gating signal includes an electric gate signal source having an output and an electric repetition rate gate having an output connected to the Q-switch, and the control circuit means comprises digital logic or analog circuitry having an input connected to the output of the gate signal source and having a first output connected to the electric light current source for reducing the pumping light level thereof, and having a second output connected to the input of the repetition rate gate for delaying activation of the latter for a time substantially equal to the time during which the pumping light level is reduced.

4. The combination of claim 1 wherein the lasing medium is an Nd:YAG laser rod, the pumping source is a krypton arc lamp connected to a source of direct current capable of supplying about 15 to 20 amperes of current to said lamp, the source of electric gating signal includes an electric gate signal source having an output, an electric repetition rate oscillator having an output connected through a repetition rate gate to the Q-switch and operable to deactivate said Q-switch on a time cycle of less than about one millisecond, and the electric control circuit comprises digital logic circuitry having an input connected to the output of the gate signal source, a first output connected to the source of direct current for reducing the output thereof by about 5 amperes for a time of about one-half millisecond, and a second output connected to the input of the repetition rate gate for delaying activation of the latter for a time substantially equal to the time during which the current of the direct current source is reduced.

5. In a Q-switched laser having a lasing medium, a continuously pumping source, a Q-switch and a source of electric gating signal for said Q-switch, the method of reducing the amplitude of the initially high amplitude laser output pulses at the start of a string of output pulses, comprising reducing the pumping level for a time and by an amount sufficient to reduce the energy stored in the lasing medium to a level no greater than the level it normally would recover to during the time between laser pulses at the operating repetition rate and pumping source level while delaying the gating signal for a time substantially equal to the time during which the pumping level is reduced.

6. In a Q-switched laser having a solid state laser rod, a continuously pumping electric light having a current source, a Q-switch and a source of electric gating signal for said Q-switch, the method of reducing the amplitude of the initially high amplitude laser output pulses at the start of a string of output pulses, comprising reducing the pumping light level for a time and by an amount sufficient to reduce the energy stored in the laser rod to a level no greater than the level it normally would recover to during the time between laser pulses at the operating repetition rate and pumping light level while delaying the gating signal for a time substantially equal to the time during which the pumping level is reduced.

7. In a Q-switched laser having an Nd:YAG laser rod, a source of direct current having an output connected to a krypton arc lamp pump source and capable of supplying about 15 to 20 amperes of current to said lamp, a Q-switch, an electric gate signal source having an output, an electric repetition rate oscillator having an output connected through a repetition rate gate to the Q-switch and operable to deactivate said Q-switch on a time cycle of less than about one millisecond, the method of reducing the amplitude of the initially high amplitude laser output pulses at the start of a string of output pulses, comprising reducing the current to the lamp by about 5 amperes for a time of about one-half millisecond and delaying the activation of the repetition rate gate during substantially the same time.

* * * * *